(12) United States Patent
Ko et al.

(10) Patent No.: US 9,367,128 B2
(45) Date of Patent: Jun. 14, 2016

(54) GLASS-TYPE DEVICE AND CONTROL METHOD THEREOF

(71) Applicant: LG ELECTRONICS INC., Seoul (KR)

(72) Inventors: Dongseuck Ko, Seoul (KR); Changho Choi, Seoul (KR); Yixuan Lin, Dalian Shi (CN)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 14/454,027

(22) Filed: Aug. 7, 2014

(65) Prior Publication Data

US 2015/0169049 A1 Jun. 18, 2015

(30) Foreign Application Priority Data

Dec. 17, 2013 (KR) .......................... 10-2013-0157564

(51) Int. Cl.
*G06F 3/01* (2006.01)
*G09G 5/00* (2006.01)
*G02B 27/00* (2006.01)
*G02B 27/01* (2006.01)

(52) U.S. Cl.
CPC ............ *G06F 3/013* (2013.01); *G02B 27/0093* (2013.01); *G02B 27/017* (2013.01); *G02B 27/0179* (2013.01); *G09G 5/006* (2013.01); *G02B 2027/0178* (2013.01); *G02B 2027/0187* (2013.01); *G09G 2320/10* (2013.01); *G09G 2340/14* (2013.01); *G09G 2354/00* (2013.01)

(58) Field of Classification Search
CPC ... A61B 3/113; G06F 19/321; G06F 19/3418; G06F 19/345; G06F 3/0412; G06F 3/0421; G06F 17/30256; G06F 19/322; G06F 19/3431; G06F 19/3487; G06F 2203/04109; G06F 3/042; G06F 3/0386; G06F 3/0423; G06F 3/0317

See application file for complete search history.

(56) References Cited

U.S. PATENT DOCUMENTS

2012/0230547 A1* 9/2012 Durnell .................. A61B 3/113
                                                       382/103
2012/0249484 A1* 10/2012 Hata ...................... G06F 3/0421
                                                       345/175

* cited by examiner

*Primary Examiner* — Gerald Johnson
(74) *Attorney, Agent, or Firm* — Dentons US LLP

(57) ABSTRACT

A glass-type device which controls the output position of an image by using the location of the user's eye. The glass-type device includes: a display portion; a mirror portion that is placed on the path of light output from the display portion so as to reflect an image output on the display portion to an external object; a sensing portion that is placed on the path of light coming from the external object and reflected by the mirror portion so as to sense an image of the external object; and a controller that controls the output image by using the sensed image.

27 Claims, 8 Drawing Sheets

GLASS-TYPE DEVICE AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10- 2013-0157564, filed on Dec. 17, 2013, the contents of which is incorporated by reference herein in its entirety.

BACKGROUND OF THE INVENTION

1. Field of the Invention

The present invention relates to a glass-type device capable of recognizing the eye and a control method thereof.

2. Background of the Invention

As a mobile terminal becomes multifunctional, the mobile terminal can be allowed to capture still images or moving images, play music or video files, play games, receive broadcast, etc., so as to be implemented as an integrated multimedia player.

Terminals can be divided into mobile/portable terminals and stationary terminals according to their mobility. The mobile terminal is a portable device that can be carried anywhere and have one or more of a function of performing voice and video calls, a function of inputting/outputting information, a function of storing data, etc.

In order to support and enhance such functions of the terminal, it can be considered to improve the configuration and/or software of the terminal.

Recently, wearable devices are being developed to increase user convenience. As an example, glass-type devices are under development. A glass-type device is designed to let the wearer see a screen in front of them, and were developed to give a sense of virtual reality.

On the other hand, a display unit for a glass-type device is configured to correspond to a user's eye location, so there is a need for a convenient way of providing information to the user.

SUMMARY OF THE INVENTION

Therefore, an aspect of the present invention is to provide a glass-type device which changes the output position of an image depending on a user's eye location and a control method thereof.

Another aspect of the present invention is to provide a glass-type device which can make better use of space by a novel method of eye detection and a control method thereof.

To achieve these and other advantages and in accordance with the purpose of this specification, as embodied and broadly described herein, there is provided a glass-type device according to one embodiment of the present invention, the glass-type device including: a display portion; a mirror portion that is placed on the path of light output from the display portion so as to reflect an image output on the display portion to an external object; a sensing portion that is placed on the path of light coming from the external object and reflected by the mirror portion so as to sense an image of the external object; and a controller that controls the output image by using the sensed image.

The location of the eye may be detected using the eye image reflected by the mirror portion and sensed by the sensing portion, and the position of the image output on the display portion may be controlled so as to correspond to the detected location of the eye.

The controller may tilt the mirror portion so that the angle of reflection of the image output on the display portion to the external object is adjusted depending on the detected location of the eye.

If the detected eye is at a first location, the controller may tilt the mirror portion so that the mirror portion is in a first position for reflecting the image output on the display portion to the first location, and if the detected eye is at a second location, different from the first location, the controller may tilt the mirror portion so that the mirror portion is in a second position, different from the first position, for reflecting the image output on the display portion to the second location.

The display portion and the controller may sequentially operate so that there is no overlap in position between the image output on the display portion and the image sensed by the sensing portion and controlled by the controller.

The glass-type device may further include infrared light-emitting parts that emit infrared light toward the mirror portion, and the sensing portion may sense infrared light emitted from the infrared light-emitting parts and reflected to the external object.

There is provided a glass-type device according to another embodiment of the present invention, the glass-type device including: a display portion that outputs an image; light-emitting parts that output infrared light; an optical path controller that is placed between the display portion and the light-emitting parts and configured to reflect the image and transmit the infrared light; a sensing portion that is configured to sense the infrared light transmitted by the optical path controller and reflected to an external object; and a controller that controls the output position of the image by using the sensed infrared light.

The glass-type device may further include a mirror portion that reflects the image output on the display portion and the infrared light output from the light-emitting parts, and the controller may tilt the mirror portion in order to control the output position of the image.

The controller may detect the location of the user's pupil by using the sensed infrared light and tilt the mirror portion so that the angle of reflection of the image output on the display portion to the external object is adjusted depending on the location of the pupil.

If an image of the detected pupil does not match a stored image of the pupil, the controller may not output the image output on the display anymore.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
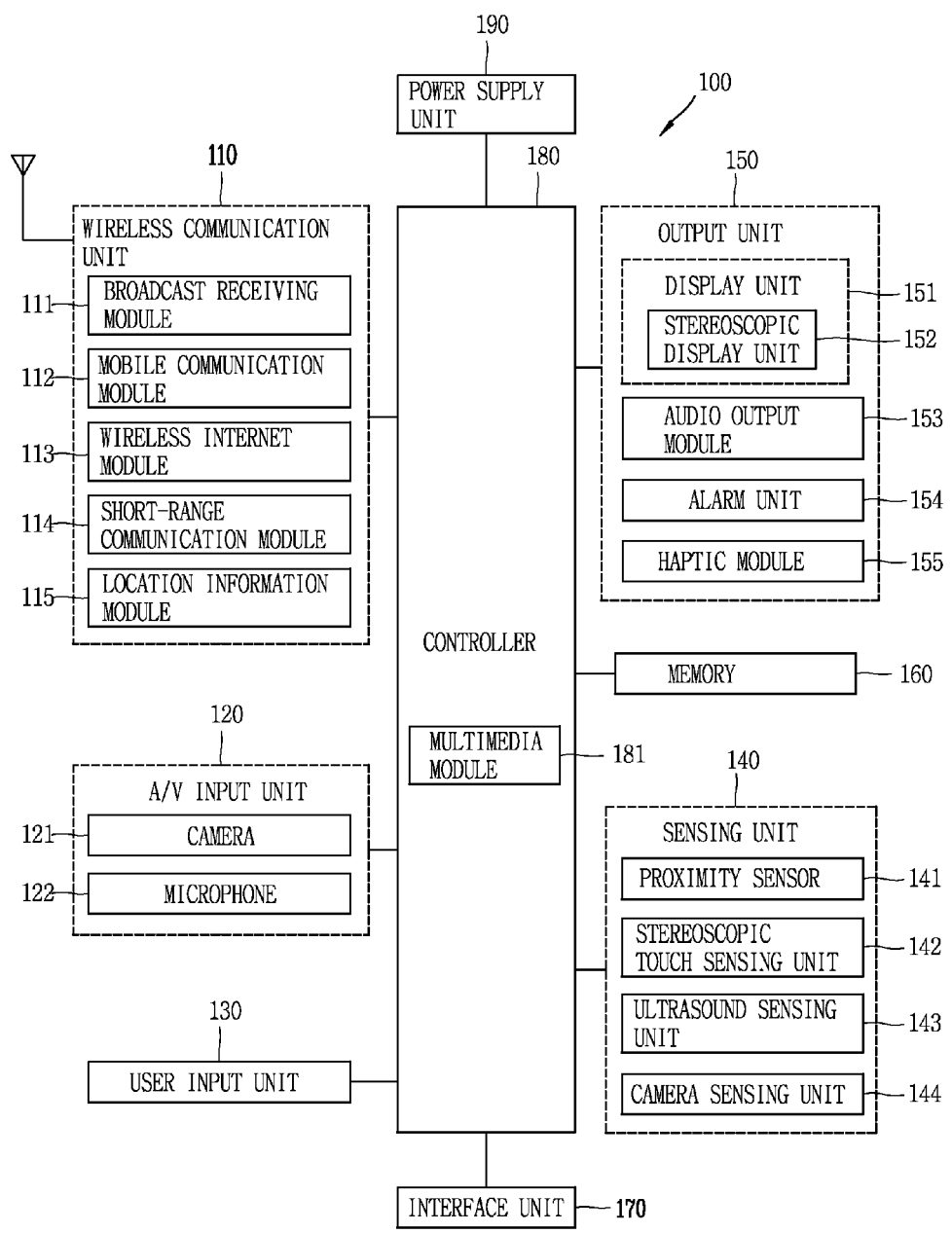
FIG. 1a is a block diagram for explaining a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
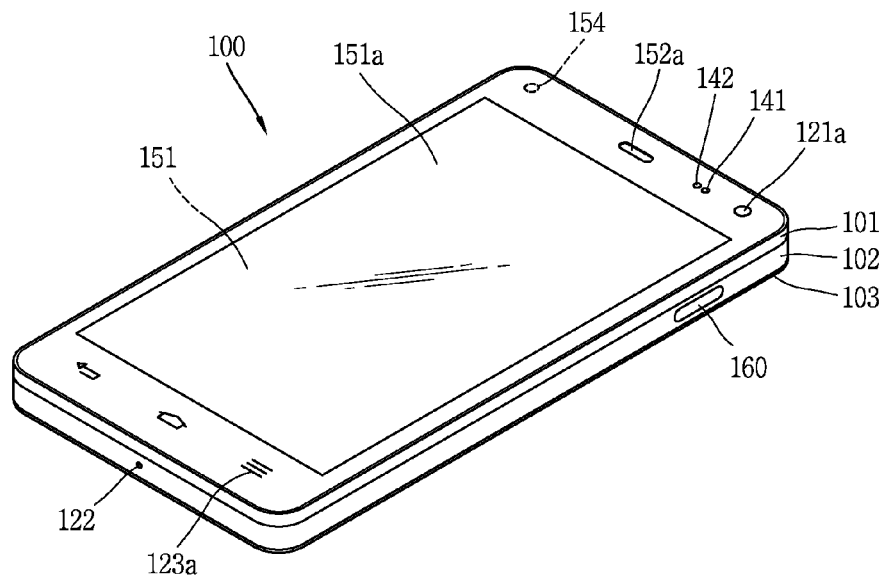
FIGS. 1b and 1c are conceptual diagrams of an example of the mobile terminal according to the present invention when viewed from different directions.
Figure 1C:
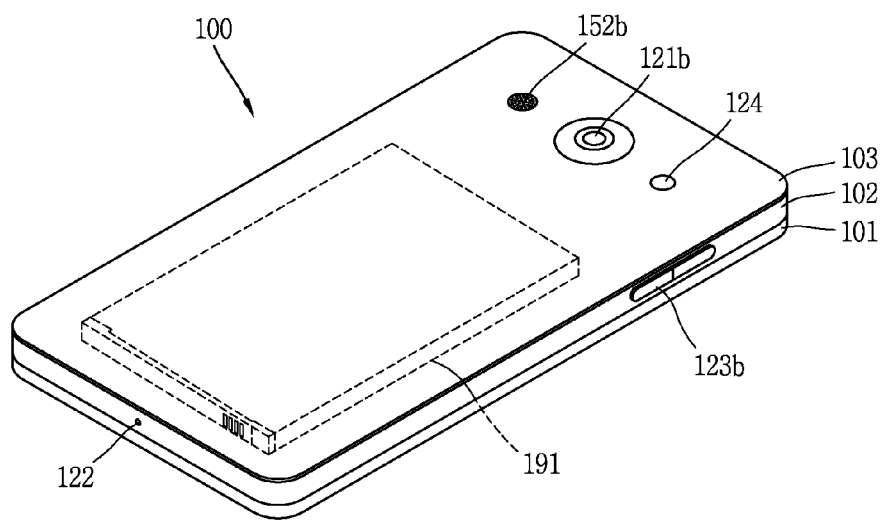

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE) , LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a mo plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1B. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of 635 the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
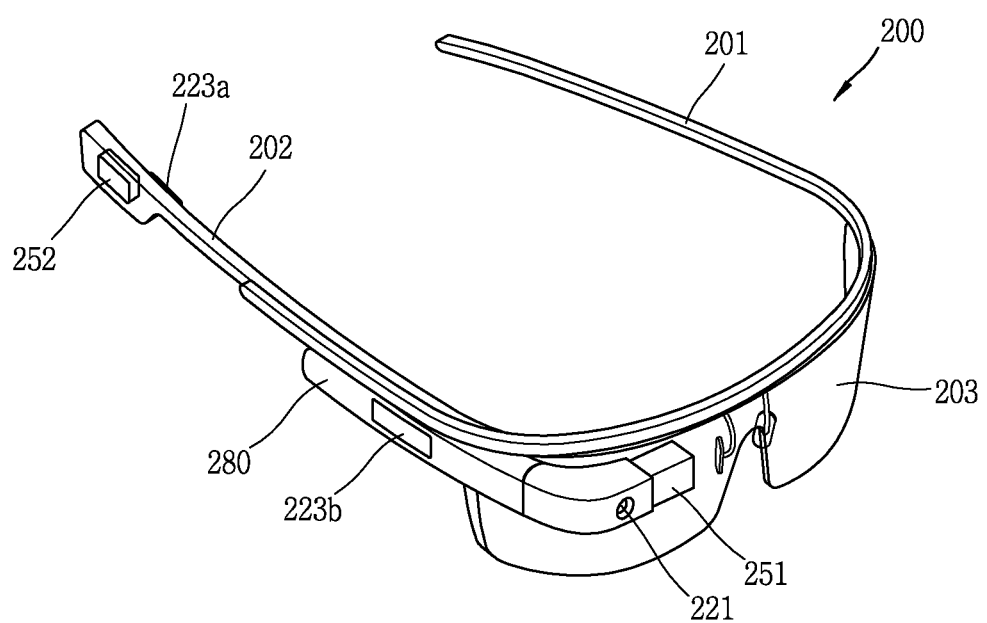
FIG. 2 is a conceptual diagram showing a glass-type device according to one embodiment of the present invention.

FIG. 2 is a perspective view illustrating one example of a glass-type mobile terminal 200 according to another exemplary embodiment.

The glass-type mobile terminal 200 can be wearable on a head of a human body and provided with a frame (case, housing, etc.) therefor. The frame may be made of a flexible material to be easily worn. The frame of mobile terminal 200 is shown having a first frame 201 and a second frame 202, which can be made of the same or different materials.

The frame may be supported on the head and defines a space for mounting various components. As illustrated, electronic components, such as a control module 280, an audio output module 252, and the like, may be mounted to the frame part. Also, a lens 203 for covering either or both of the left and right eyes may be detachably coupled to the frame part.

The control module 280 controls various electronic components disposed in the mobile terminal 200. The control module 280 may be understood as a component corresponding to the aforementioned controller 180. FIG. 2 illustrates that the control module 280 is installed in the frameon one side of the head, but other locations are possible.

The display unit 251 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 200, the display unit 251 may be located to correspond to either or both of the left and right eyes. FIG. 2 illustrates that the display unit 251 is located on a portion corresponding to the right eye to output an image viewable by the user's right eye.

The display unit 251 may project an image into the user's eye using a prism. Also, the prism may be formed from optically transparent material such that the user can view both the projected image and a general visual field (a range that the user views through the eyes) in front of the user.

In such a manner, the image output through the display unit 251 may be viewed while overlapping with the general visual field. The mobile terminal 200 may provide an augmented reality (AR) by overlaying a virtual image on a realistic image or background using the display.

The camera 221 may be located adjacent to either or both of the left and right eyes to capture an image. Since the camera 221 is located adjacent to the eye, the camera 221 can acquire a scene that the user is currently viewing.

The camera 221 is provided at a control module 280. However, the present invention is not limited to this. The camera 221 may be provided at the frame part. In some embodiments, multiple cameras 221 may be utilized. Such multiple cameras 221 may be used to acquire a stereoscopic image.

The glass-type mobile terminal 200 may include user input units 223a and 223b, which can each be manipulated by the user to provide an input. The user input units 223a and 223b may employ techniques which permit input via a tactile input. Typical tactile inputs include a touch, push, or the like. The user input units 223a and 223b are shown operable in a pushing manner and a touching manner as they are located on the frame and the control module 280, respectively.

If desired, mobile terminal 200 may include a microphone which processes input sound into electric audio data, and an audio output module 252 for outputting audio. The audio output module 252 may be configured to produce audio in a general audio output manner or an osteoconductive manner. When the audio output module 252 is implemented in the osteoconductive manner, the audio output module 252 may be closely adhered to the head when the user wears the mobile terminal 200 and vibrate the user's skull to transfer sounds.

The present invention relates to a glass-type device including at least one of the above-described components. A method of controlling the output position of an image output on a display by recognizing the user's eye will be described.

As the glass-type device, due to its features, gets an image projected straight into the user's eye, it is important in which direction the user is facing. Hence, the glass-type device according to the present invention provides various methods of recognizing the user's eye.

Figure 3:
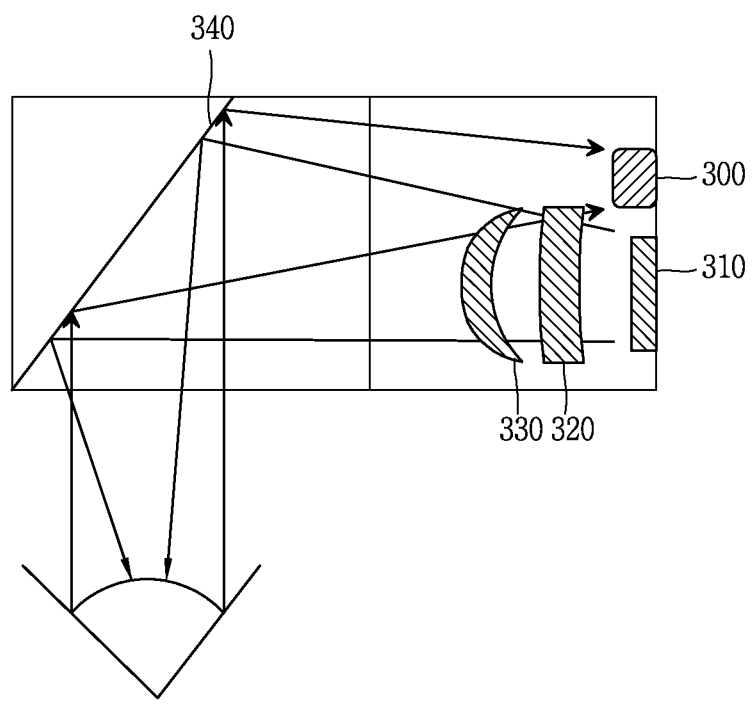
FIG. 3 is a conceptual diagram showing an optical structure of a glass-type device according to another embodiment of the present invention.
Figure 4:
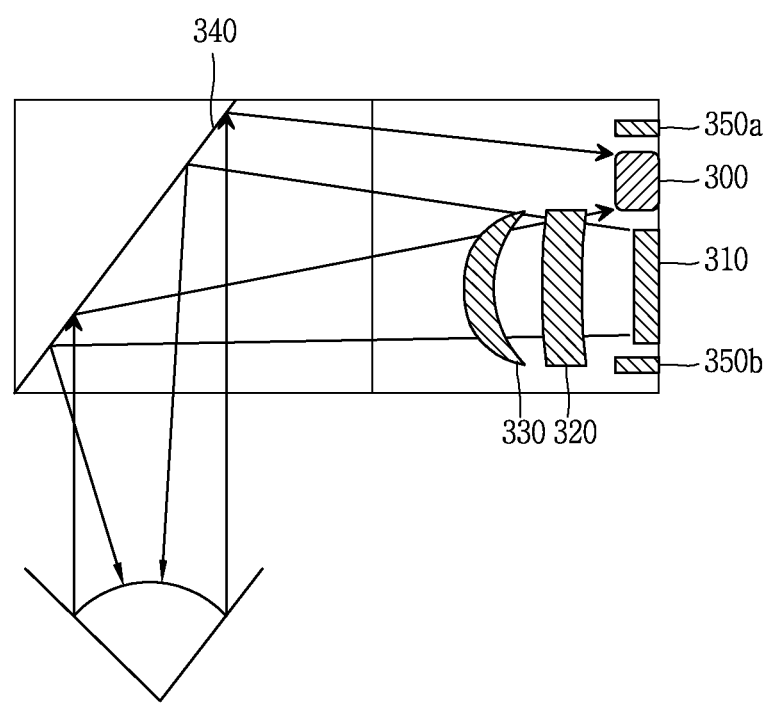
FIG. 4 is a conceptual diagram showing an optical structure of a glass-type device according to another embodiment of the present invention.
Figure 5:
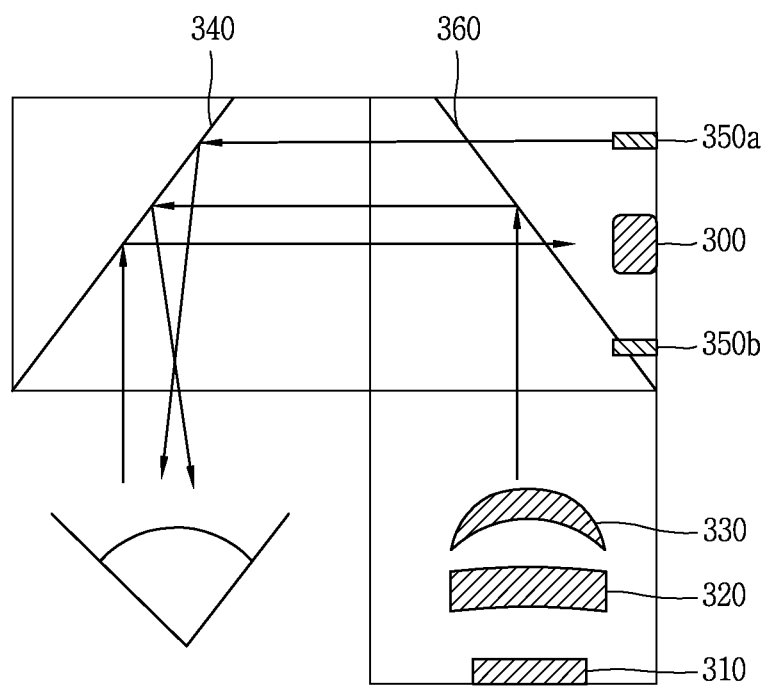
FIG. 5 is a conceptual diagram showing an optical structure of a glass-type device according to yet another embodiment of the present invention.

FIGS. 3, 4, and 5 are conceptual diagrams showing an optical structure of a glass-type device according to one embodiment of the present invention.

Referring to FIG. 3, a glass-type device according to one embodiment of the present invention may include at least one of a display portion 310, a mirror portion 340, a sensing portion 300, and a controller 280 (or control module). At least one of these components may be mounted within a frame portion.

The display portion 310 may output an image to project the image straight into the user's eye. The image may include all information such as text, graphics, etc a mobile terminal can provide. The display portion 310 may consist of a plurality of light sources for outputting images. For example, the display portion may be a microdisplay. For example, the microdisplay may be a light emitting diode LED, a laser diode LD, or the like. The microdisplay may have transparency.

Moreover, an image output from the display portion 310 may be magnified to fill the user's field of view by using imaging lenses 320 and 330. The imaging lenses 320 and 330 may be concave lenses. A concave lens may have one convex surface and one concave surface. The concave lens may magnify the image by changing the path of light from the image output on the display portion 310.

The magnified image may be projected straight into the user's eye. The display portion 310 may have optical transparency, and may be allocated to at least one of the user's eyes. As explained in FIG. 2, the display portion 310, allocated to at least one of the user's eyes, may provide an image output on the display portion 310, as well as bringing into view the outside world including the general field of view (the extent of the observable world the user sees through the eyes) ahead of the user.

In this way, the image output through the display portion 310 is seen overlapping with the general field of view, which allows the user to see a virtual image overlaid on a real world image or the background in an augmented reality (AR) display.

According to the present invention, the mirror portion 340 (a half-mirror or prism, for example) may be provided to reflect the image output on the display portion 310 to an external object. The mirror portion 340 may have one reflecting surface or two reflecting surfaces. For example, the mirror portion 340 may project the image onto the external object by changing the path of the image output on the display portion 310. The external object may be at least one of the user's eyes.

A plurality of mirror portions 340 may be provided in order to presents a three-dimensional image to the user. The plurality of mirror portions 340 may be placed into different positions by the controller 280. The controller 280 may control the output format of an image by using the plurality of mirror portions 340 placed in different positions. The output format may involve three-dimensional format. That is, the controller 280 may control the plurality of mirror portions 340 to present a three-dimensional image to the user.

The mirror portion 340 may be placed in a position that faces the display portion 310. Alternatively, the mirror portion 340 may be placed perpendicular to the direction of the user's eyes facing ahead, in order to display the outside world and the image output on the display portion 310 together.

The mirror portion 340 may be a half-mirror. The half-mirror is a mirror that reflects part of light and transmits the other part. More specifically, the half-mirror may transmit light of a specific wavelength region and reflect light of other wavelength regions.

Due to this property of the half-mirror, even when the mirror portion 340 is placed perpendicular to the direction of the user's eyes, the outside world in front of the user's field of view is transmitted and the image output on the display portion 310 is reflected, whereby the user can see the outside world and the output image overlaid on one another.

To transmit the image output on the display portion 310 to the mirror portion 340, the glass-type device according to the present invention may further include an optical waveguide which guides the image through it. The optical waveguide may be configured to minimize loss when the light of the image output on the display portion 310 reaches the mirror portion 340. For example, the optical waveguide may consist of a material that fully reflects the energy of light hitting the optical waveguide.

The image that reaches the mirror portion 340 through the optical waveguide may be reflected to an external object. The external object may be the user's eye. When the image reaches the user's eye, at least part of the light of the image may be absorbed by the user's eye, and the other part may be reflected and re-enter the mirror portion 340.

According to the present invention, the sensing portion 300 may sense the light that comes from the external object, which has received the image reflected by the mirror portion 340, and is reflected again by the mirror portion 340. That is, the sensing portion 300 may reflect the light coming from the external object and reflected by the mirror portion 340, in order to sense an image of the external object. The properties of the light sensed by the sensing portion 300 may include light intensity, brightness (luminosity), light wavelength, etc. To this end, the sensing portion 300 may include various kinds of sensors. For example, the sensing portion 300 may be an optical sensor, an infrared sensor, etc.

The sensing portion 300 may be placed in a position that faces the mirror portion 340 in order to sense light reflected by the mirror portion 340. For example, the sensing portion 300 may be placed near the display portion 310, in a position that faces the mirror portion 340. Accordingly, no extra space for camera installation is required near the display portion 310 to sense the user's eye, thus making better use of space. Further, the sensing portion 300, consisting of a sensor, occupies smaller area than the camera, so it can contribute to the lightweight design of the glass-type device.

Besides, the sensing portion 300 may create an image of the external object by using the light coming from the external object and reflected by the mirror portion 340. The reflected light may have a level of luminosity enough to create an image of the external object. That is, if the luminosity of the reflected light is less than or equal to a preset level, the sensing portion 300 may continue to sense light or increase the performance of the light sensor.

The image created using the light sensed by the sensing portion 300 may be transmitted to the controller 280.

The controller 280 may control the sensing portion 300, the mirror portion 340, and the display portion 310 by using the transmitted image of the external object. That is, the controller 280 may control the sensing portion 300, the mirror portion 340, and the display portion 310 using the transmitted image, in order to control the output position of the image output on the display portion 310. For example, the controller 280 may tilt the mirror portion 340 so as to correspond to the position of the transmitted image. That is, the controller 280 may change the reflection path of light by moving the reflecting plane of the mirror portion 340 by tilting.

Here, the image of the external object may be an image of the user's eye who is wearing the glass-type device. In this case, the controller 280 may detect the location of the eye (or the pupil) by using the eye image. For example, the controller 280 may detect the location of the eye by detecting colors from the entire parts of the eye image and perceiving the darkest part as where the eye is located.

Afterwards, the controller 280 may tilt the mirror portion 340 so that the angle of reflection of the image output on the display portion to the external object is adjusted depending on the location of the eye. By doing so, the field of view ahead of the user and the output position of the image output on the display portion 310 may be adjusted to match each other due to the features of the glass-type device. Accordingly, the glass-type device according to the present invention provides a more realistic augmented reality environment to the user.

Meanwhile, an image controlled by the controller 280 and an image output in real time on the display portion 310 may interfere (overlap) with each other.

Accordingly, the display portion 310 and the controller 280 may sequentially operate so that there is no overlap between the image output on the display portion 310 and the image sensed by the sensing portion and controlled by the controller 280. For example, if the display portion 310 operates at 30 frames per second, the controller 280 can operate in between these frames.

The method of detecting the location of the user's eye by using light reflected from the user's eye has been described so far. The glass-type device according to the present invention can contribute to the slim and lightweight design of the glass-type device by using light reflected from the user's eye, without a camera for detecting the location of the user's eye.

Moreover, the glass-type device according to the present invention may be more advantageous than other devices in terms of cost, because it does not require a camera to be attached near the user's eye.

Hereinafter, an optical structure of a glass-type device according to another embodiment of the present invention will be described. FIG. 4 is a conceptual diagram showing an optical structure of a glass-type device according to another embodiment of the present invention.

A glass-type device according to another embodiment of the present invention may further include infrared light-emitting parts 350a and 350b, in addition to the structure of FIG. 3. The infrared light-emitting parts 350a and 350b may emit infrared light. For example, the infrared light-emitting parts 350a and 350b may be infrared cameras.

In this case, the infrared light-emitting parts 350a and 350b may be located adjacent to the display portion 310 and the sensing portion 300. That is, in the present invention, the infrared light-emitting parts 350a and 350b do not occupy any area near the user's eye.

The infrared light-emitting parts 350a and 350b may emit infrared light toward the mirror portion 340 so that the infrared light is directed to an external object. Here, the external object may be the user's eye.

Afterwards, when the infrared light is emitted toward the user's eye, the sensing portion 300 may sense the infrared light reflected from the user's pupil so as to detect the location of the user's pupil.

The controller 280 may detect the location of the user's pupil by using the infrared light sensed by the sensing portion 300. In this case, the infrared light absorbing property of the user's pupil may be used.

More specifically, when infrared light emitted from the infrared light-emitting parts 350a and 350b reaches the user's eye, the pupil part of the eye can absorb more infrared light than the other parts. Having sensed the infrared light reflected again from the user's eye, the sensing portion 300 may create an image of the user's eye using the infrared light. Afterwards, the sensing portion 300 may transmit the eye image to the controller 280, and the controller 280 may decide that the pupil is located in a part darker than the other parts of the eye image due to its large amount of infrared absorption. In this way, the location of the pupil in the eye image can be detected using the property of the pupil part in the user's eye that absorbs more infrared light than the other parts.

When the location of the pupil is detected, the controller 280 may tilt the mirror portion 340 so that the output position of the image output on the display portion 310 corresponds to the location of the pupil. The tilting of the mirror portion 340 may be similar to that described with reference to FIG. 3.

The method of detecting the location of the pupil using the infrared light-emitting parts 350a and 350b has been described so far. The glass-type device according to the present invention can increase the accuracy of detection of the pupil by using the infrared light absorbing property of the pupil. As a result, the glass-type device according to the present invention can give the user a realistic virtual view, which is important for the glass-type device.

Hereinafter, an optical structure of a glass-type device according to yet another embodiment of the present invention will be described. FIG. 5 is a conceptual diagram showing an optical structure of a glass-type device according to yet another embodiment of the present invention.

A glass-type device according to yet another embodiment of the present invention may include at least one of the sensing portion 300, the display portion 310, the mirror portion 340, an optical path controller 360, and light-emitting parts (or the light-emitting parts 350a and 350b).

As shown in FIG. 5, a glass-type device according to yet another embodiment of the present invention may be spaced apart from the display portion 310, the light-emitting parts 350a and 350b, and the sensing part 300. For example, the display portion 310, the light-emitting parts 350a and 350b, and the sensing part 300 may be perpendicular to one another. As a result, the space for the glass-type device can be optimized.

The optical path controller 360 may be placed between the display portion 310 and the light-emitting parts 350a and 350b. Moreover, the optical path controller 360 may reflect an image output on the display portion 310 to an external object, and transmit infrared light emitted from the light-emitting parts 350a and 350b. In this way, the optical path controller 360 can increase location accuracy by selectively transmitting light depending on its wavelength. An example of the optical path controller 360 may include a specially-coated mirror that only absorbs a specific wavelength.

When the infrared light emitted from the light-emitting parts 350a and 350b is transmitted by the optical path controller 360, it may reach an external object. The external object may be at least one of the user's eyes.

When the infrared light reaches at least one of the user's eyes, at least part of the infrared light may be absorbed and the other part may be reflected. The infrared light reflected from at least one of the user's eyes may be reflected by the mirror portion 340 and transmitted through the optical path controller 360. The transmitted infrared light may be sensed by the sensing portion 300.

The sensing portion 300 may sense an image of the user's pupil by using the transmitted infrared light. Afterwards, the controller 280 may detect the location of the pupil using the pupil image. The detection of the location of the pupil may be similar to that described with reference to FIG. 4.

The method of detecting the location of the user's pupil using the optical path controller 360 and controlling the output position of an image using the location of the user's pupil has been described so far. The glass-type device according to the present invention can make optimum use of space by spacing the display portion 310 and the sensing portion 300 apart from each other, by using the property of the optical path controller 360 that it only absorbs a specific wavelength.

Hereinafter, a method of controlling the output position of an image in a glass-type device having any one of the optical structures of FIGS. 3, 4, and 5 will be described in more detail. Although the following embodiment will be described by taking the structure of FIG. 3 as an example, the present invention is not limited thereto and it will be apparent to those skilled in the art that the present invention also applies to the structures of FIGS. 4 and 5.

Figure 6:
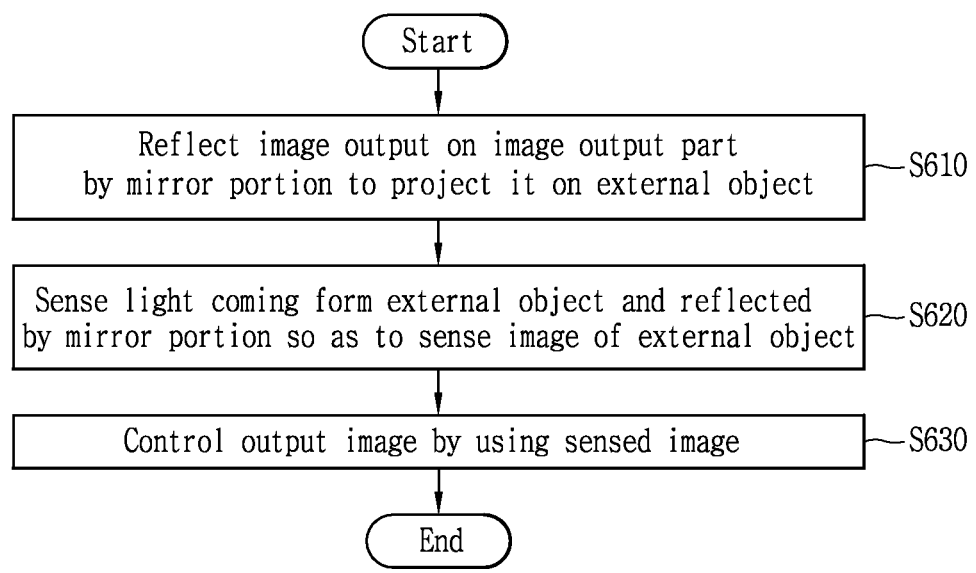
FIG. 6 is a flowchart showing a control method of a glass-type terminal according to one embodiment of the present invention.
Figure 7:
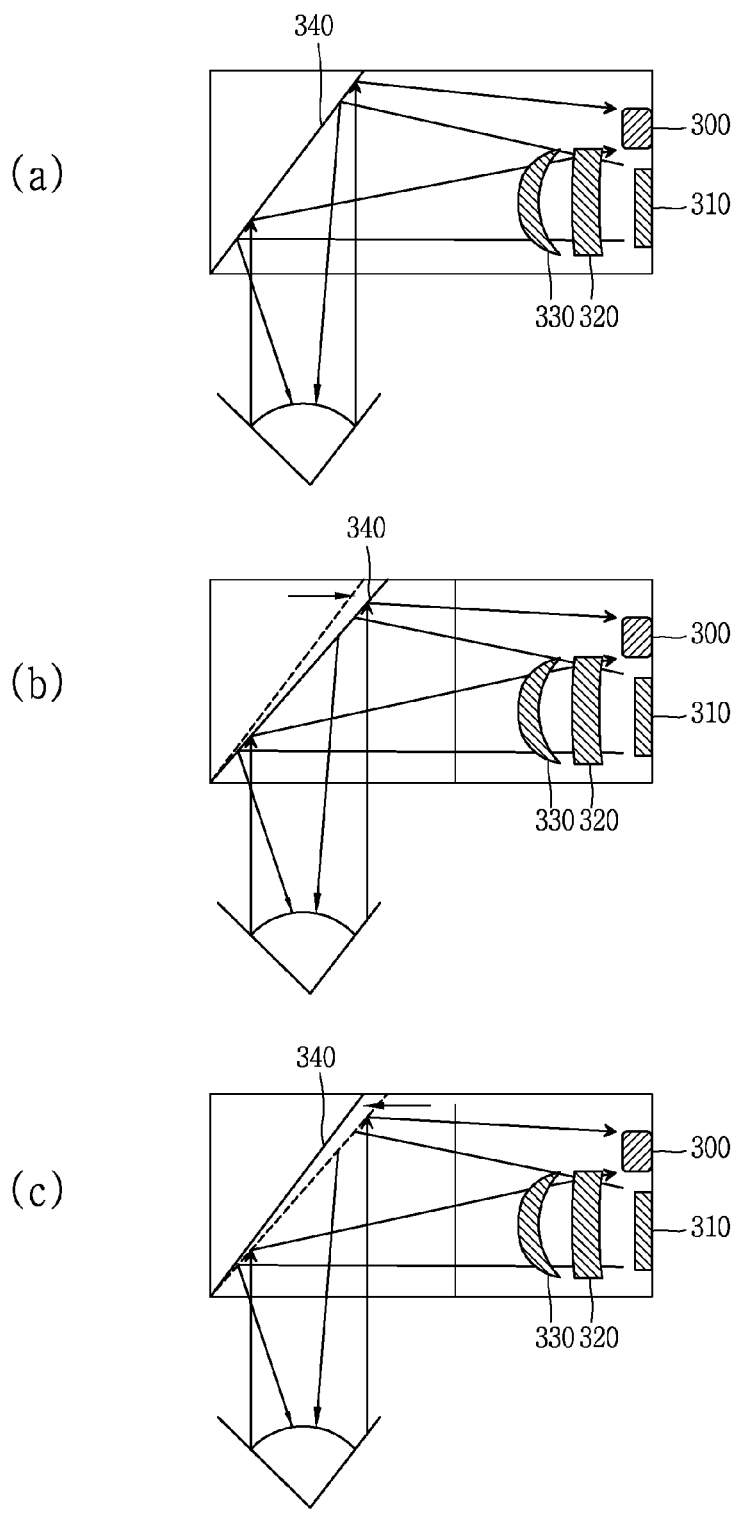
FIG. 7 is a conceptual diagram of a simplified optical structure of the glass-type device to describe the control method of FIG. 6.

FIG. 6 is a flowchart showing a control method of a glass-type terminal according to one embodiment of the present invention. FIG. 7 is a conceptual diagram of a simplified optical structure of the glass-type device to describe the control method of FIG. 6.

A glass-type device according to one embodiment of the present invention may carry out the step of reflecting an image output on the display portion 310 by the mirror portion to project it on an external object (S610).

The mirror portion 340 may change the path of the image to allow the user to see the image output on the display portion 310. The mirror portion 340 may be a prism.

The user can see the view ahead, together with the image on the display portion 310 of the glass-type device 310 that is reflected by the mirror portion 340.

The glass-type device according to the embodiment of the present invention may carry out the step of sensing the light coming from the external object and reflected by the mirror portion so as to sense an image of the external object after the output image is projected on the external object (S620).

The sensing portion 300 may sense an image of the external object. The external object may be at least one of the user's eyes. The sensing portion 300 may sense the light coming from the external object and reflected by the mirror portion 340. The reflected light may have a level of luminosity enough to create an image of the external object. That is, if the luminosity of the reflected light is less than or equal to a preset level, the sensing portion 300 may continue to sense light or increase the performance of the light sensor.

When the light is sensed, the sensing portion 300 may create an image of the external object by using the reflected light. Afterwards, the sensing portion 300 may transmit the image of the external object to the controller 280.

Next, the glass-type device according to the embodiment of the present invention may carry out the step of controlling the output image by using the sensed image (S630).

The controller 280 may control the output position of the image output on the display portion 310 by using the image sensed by the sensing portion 300. More specifically, as shown in FIG. 7, the controller 280 may control the output position of the image by adjusting the position of the mirror portion 340.

As shown in (a) of FIG. 7, the controller 340 may reflect the image output on the display portion 310 to an external object. In this case, the controller 280 may change the output position of the image by adjusting the reflection direction. Although FIG. 7 illustrates only one mirror portion 340 below for simplicity, the present invention also applies to a plurality of mirror portions 340.

For example, as shown in (b) of FIG. 7, if the eye is at a first location, the controller 280 may tilt the mirror portion 340 so that the mirror portion 340 is in a first position for reflecting the image output on the display portion 310 to the first location. The mirror portion 340 may reflect the image to the first location. As a result, the user can always see the image, regardless of whether the user moves the gaze or not.

In another example, as shown in (c) of FIG. 7, if the eye is at a second location, different from the first location, the controller 280 may tilt the mirror portion 340 so that the mirror portion 340 is in a second position, different from the first position, for reflecting the image output on the display portion 310 to the second location. In this case, the mirror portion 340 may reflect the image to the second location and project the image on the user's eye at the second location.

On the other hand, if the controller 280 cannot detect the location of the pupil by using the image sensed by the sensing portion 300, it may project the image output on the display portion 310 on an external object as it is. In this case, the user can continue seeing the image even when the detection of the location of the pupil fails.

In still another example, if the controller 280 cannot detect the location of the pupil, it may output notification information indicating that the location of the pupil is not detected. The notification information may include at least one of visual, auditory, and tactile information or a combination thereof. For example, the controller 280 may output a graphics object indicating a failure to detect the location of the pupil. Therefore, the user can take various measures to increase the rate of recognition of the pupil when an augmented reality screen the user is currently viewing is not output at an appropriate position.

The method of recognizing the location of the user's eye and controlling the output position of an image has been described so far.

Hereinafter, various other methods of controlling the output position of an image using the location of the pupil, in the glass-type device capable of detecting the location of the pupil, will be described.

The controller 280 may detect the location of the pupil by using an eye image sensed by the sensing portion 300. In this case, the controller 280 may perform a different control task depending on a change in the location of the pupil. The change in the location of the pupil may involve vertical or lateral movement of the pupil.

The controller 280 may perform a different control task depending on a change in the location of the pupil. For example, the controller 280 may control various attributes associated with output, such as information output level and information output state, depending on a change in the location of the pupil. The information output level may involve the amount of information output in the image. The information output state may involve whether to output information or not, or enlarging or reducing specific information.

For example, if the pupil moves vertically, the controller 280 may output additional information about the image currently projected on the eye. The additional information may denote detailed information about the currently projected image. Alternatively, the additional information may denote detailed information about some other than the image currently projected on the eye, of all images. In this case, the controller 280 may perceive vertical movement of the pupil as vertical scrolling of a scrollbar.

In another example, if the pupil moves laterally, the controller may not output the image currently projected on the eye anymore. That is, the controller 280 may stop outputting the image output on the display portion 310. The controller 280 may perceive lateral movement of the pupil as lateral scrolling of the scrollbar.

Moreover, the controller 280 may perform pupil recognition by using the image of the user's eye. That is, the controller 280 may perform various control tasks associated with the security of the glass-type device by using the pupil image.

For example, if the recognized pupil image does not match a stored pupil image, the controller 280 may control the display portion 310 not to output an image. As a result, the user can disable the functions associated with the glass-type device in case other people wear their glass-type device. That is, the pupil image may be used as a means of unlocking the glass-type device.

In yet another example, if the pupil image matches a stored pupil image, the controller 280 may output an image associated with personal information. The personal information may be security-related information including information associated with payment such as ID card number, password, or authentication certificate. Therefore, the user can protect their personal information efficiently even when they lost the glass-type device.

In a further example, if the pupil image matches a stored pupil image, the controller 280 may make payment simply by pupil recognition, without entering a password for payment, when an image associated with payment appears. Therefore, the user can make payment easily without a lot of user operations, due to the features of the glass-type device. Moreover, security for payment can be strengthened by pupil recognition.

The method of performing various control tasks by recognizing the pupil using a pupil image has been described so far. As a result, the user can protect security-related information in case of loss of the glass-type device. In addition, various functions can be performed simply by pupil recognition, so the functions can be used easily, without control instructions from the user.

The glass-type device according to the present invention is able to control the output position of an image by recognizing the user's eye, without a camera. Accordingly, the glass-type device according to the present invention can present an image output on the display portion and the outside world the user is actually seeing in a more realistic way.

Moreover, the glass-type device according to the present invention can recognize the user's eye by using light reflected from the user's eye, without a camera. This brings advantages to the slim and lightweight design of the glass-type device due to the features of the glass-type device.

In addition, the glass-type device according to the present invention can perform various functions of the glass-type device easily without control instructions.

Furthermore, the glass-type device according to the present invention can strengthen the security of the user's personal information through pupil recognition.

What is claimed is:

1. A glass-type device, comprising:
    a display outputting a displayed image to be projected onto an object;
    a sensor comprising an optical sensor and an infrared, wherein the sensor does not include a camera;
    a mirror positioned to:
        reflect the displayed image output from the display in a first direction toward the object, the object being spaced apart from the display and the sensor, and
        reflect light, received at the mirror from a second direction that is opposite to the first direction, toward the sensor, the reflected light representative of an image of the object, wherein the sensor senses the light received from the second direction to obtain a sensed image of the object; and
    a controller controlling a position of the displayed image projected on the object using data derived from the sensed image of the object,
    wherein the sensor is positioned to face towards the mirror such that the sensor senses light reflected by the mirror.

2. The glass-type device of claim 1, wherein the object is an eye comprising an iris and a pupil or the pupil of the eye.

3. The glass-type device of claim 1, wherein a location of the object is detected from the sensed image of the object, and the controller controls the position of the displayed image projected on the object to correspond to the detected location of the object.

4. The glass-type device of claim 3, wherein the object is an eye comprising an iris and a pupil or the pupil of the eye.

5. The glass-type device of claim 3 wherein the controller controls the position of the displayed image projected on the object by adjusting a position of the mirror.

6. The glass-type device of claim 5, wherein the object is an eye comprising an iris and a pupil or the pupil of the eye.

7. The glass-type device of claim 3, wherein if the detected location of the object is at a first location, the controller adjusts the position of the mirror to a first position to project the displayed image on the object at the first location, and when the detected location of the object is at a second location, different from the first location, the controller adjusts the position of the mirror to a second position, different from the first position, to project the displayed image on the object at the second location.

8. The glass-type device of claim 1, wherein
light reflected from the object is sensed by the sensor as a sensed image;
the controller detects the location of the object from the sensed image; and
the controller sequentially causes the display to output the displayed image and detects the location of the object from the sensed image.

9. The glass-type device of claim 1, further comprising an infrared light-emitting device illuminating the object with infrared light reflected toward the object by the mirror, and
the sensor senses infrared light reflected back from the object.

10. A glass-type device, comprising:
a display outputting a displayed image to be projected onto an object;
a sensor comprising an optical sensor and an infrared sensor, wherein the sensor does not include a camera;
an emitter emitting infrared light;
a mirror;
an optical path controller having a first side proximate to the display and a second side proximate to the sensor and the emitter, the optical path controller placed between the display and the emitter, the optical path controller arranged to:
reflect, from the first side, the displayed image toward the mirror, and
transmit, from the second side through the first side, the infrared light toward the mirror,
wherein the mirror is positioned to:
reflect the displayed image, reflected from the optical path controller, in a first direction toward the object, the object being spaced apart from the display and the emitter, and
reflect infrared light, received at the mirror from a second direction that is opposite to the first direction, toward the optical path controller, the reflected infrared light representative of an image of the object;
wherein the sensor senses the reflected infrared light received from the mirror and transmitted through the optical path controller from the first side through the second side to obtain a sensed image of the object; and
a controller controlling a position of the displayed image projected on the object using data derived from the sensed image of the object,
wherein the sensor is positioned to face towards the mirror such that the sensor senses light reflected by the mirror.

11. The glass-type device of claim 10, wherein the object is an eye comprising an iris and a pupil or the pupil of the eye.

12. The glass-type device of claim 10, wherein a location of the object is detected from the sensed image of the object, and the controller controls the position of the displayed image projected on the object to correspond to the detected location of the object.

13. The glass-type device of claim 12, wherein the object is an eye comprising an iris and a pupil or the pupil of the eye.

14. The glass-type device of claim 12 wherein the controller controls the position of the displayed image projected on the object by adjusting a position of the mirror.

15. The glass-type device of claim 14, wherein the object is an eye comprising an iris and a pupil or the pupil of the eye.

16. The glass-type device of claim 12, wherein if the detected location of the object is at a first location, the controller adjusts the position of the mirror to a first position to project the displayed image on the object at the first location, and when the detected location of the object is at a second location, different from the first location, the controller adjusts the position of the mirror to a second position, different from the first position, to project the displayed image on the object to the second location.

17. The glass-type device of claim 2, wherein if an image of the pupil sensed by the sensor does not match a stored image of the pupil, the controller causes the display to stop outputting a displayed image.

18. A control method of a glass-type device, the method comprising:
outputting a displayed image from a display;
reflecting the displayed image from a mirror in a first direction toward an object spaced apart from the display;
reflecting light, received at the mirror from a second direction that is opposite to the first direction, toward a sensor, the reflected light representative of an image of the object, wherein the sensor comprises an optical sensor and an infrared sensor, and does not include a camera, and wherein the sensor is positioned to face towards the mirror such that the sensor senses light reflected by the mirror;
sensing, by the sensor, the light received from the second direction to obtain a sensed image of the object; and
controlling, by a controller, a position of the displayed image projected on the object using data derived from the sensed image of the object.

19. The control method of claim 18, wherein the sensed image of the object is a sensed image of a user's eye, a location of a pupil of the user's eye is detected by using the sensed image of the user's eye, and the position of the displayed image projected on the object is controlled based on the detected location of the pupil.

20. The control method of claim 19, further comprising adjusting, by the controller, a position of the mirror to project the displayed image on the object at the detected location of the pupil.

21. A control method of a glass-type device, the method comprising:
projecting an image on a first optical device;
transmitting infrared light through the first optical device, wherein the first optical device reflects visible light and transmits infrared light;
guiding the projection of the image and the transmitted infrared light toward an object;
sensing infrared light reflected back from the object toward the first optical device, the infrared light transmitted through the first optical device to an infrared light sensor, wherein the infrared light sensor is positioned to face towards a mirror such that the infrared light sensor senses light reflected by the mirror; and
controlling the position of the projected image on the object using the sensed infrared light reflected back from the object.

22. The control method of claim 21, wherein, in the step of sensing, a location of the object is detected from the image of the object illuminated by the infrared light and sensed by the sensor, and in the step of controlling the position of the projected image, the position of the projected image on the object is adjusted to correspond to the detected location of the object.

23. The glass-type device of claim 4, wherein if an image of the pupil sensed by the sensor does not match a stored image of the pupil, the controller causes the display to stop outputting a displayed image.

24. The glass-type device of claim 6, wherein if an image of the pupil sensed by the sensor does not match a stored image of the pupil, the controller causes the display to stop outputting a displayed image.

25. The glass-type device of claim 11, wherein if an image of the pupil sensed by the sensor does not match a stored image of the pupil, the controller causes the display to stop outputting a displayed image.

26. The glass-type device of claim 13, wherein if an image of the pupil sensed by the sensor does not match a stored image of the pupil, the controller causes the display to stop outputting a displayed image.

27. The glass-type device of claim 15, wherein if an image of the pupil sensed by the sensor does not match a stored image of the pupil, the controller causes the display to stop outputting a displayed image.

* * * * *